United States Patent
Khaja et al.

(10) Patent No.: US 10,160,279 B2
(45) Date of Patent: Dec. 25, 2018

(54) HYDRAULICALLY OPERATED ACTUATOR FOR CONTROLLING VEHICLE RIDE HEIGHT

(71) Applicant: GM GLOBAL TECHNOLOGY OPERATIONS LLC, Detroit, MI (US)

(72) Inventors: Najmuddin Khaja, Livonia, MI (US); Brian D. Christoff, Ann Arbor, MI (US); Joshua T. Cyrul, Farmington Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 230 days.

(21) Appl. No.: 15/359,763

(22) Filed: Nov. 23, 2016

(65) Prior Publication Data
US 2018/0141399 A1 May 24, 2018

(51) Int. Cl.
| | |
|---|---|
| *B60G 15/06* | (2006.01) |
| *B60G 17/016* | (2006.01) |
| *B60G 11/14* | (2006.01) |
| *B60G 13/16* | (2006.01) |
| *B60G 17/027* | (2006.01) |

(52) U.S. Cl.
CPC ............ *B60G 17/016* (2013.01); *B60G 11/14* (2013.01); *B60G 13/16* (2013.01); *B60G 15/06* (2013.01); *B60G 17/0272* (2013.01); *B60G 2202/24* (2013.01); *B60G 2202/31* (2013.01); *B60G 2202/413* (2013.01); *B60G 2400/252* (2013.01); *B60G 2500/30* (2013.01)

(58) Field of Classification Search
CPC ...... B60G 15/06; B60G 17/16; B60G 17/005; B60G 17/04; B60G 2800/914; B60G 2202/31; B60G 2202/24; B60G 2400/252
See application file for complete search history.

(56) References Cited

U.S. PATENT DOCUMENTS

| | | | |
|---|---|---|---|
| 4,453,745 A | 6/1984 | Nelson | |
| 4,565,349 A | 1/1986 | Tomlin | |
| 5,058,868 A * | 10/1991 | Sirven | B60G 17/08 188/313 |
| 6,676,323 B2 | 1/2004 | Oen | |
| 6,817,597 B1 * | 11/2004 | Thurow | B60G 11/265 267/122 |
| 6,840,726 B2 | 1/2005 | Gosling | |

(Continued)

*Primary Examiner* — James A English
(74) *Attorney, Agent, or Firm* — Quinn IP Law (57) ABSTRACT

A hydraulic actuator assembly is configured to receive a pressurized fluid from a pump. The hydraulic actuator assembly includes a housing and a piston arranged concentrically with respect to a longitudinal axis, wherein the housing is configured to receive a first portion of the pressurized fluid to displace the piston relative to the housing. The hydraulic actuator assembly also includes a sleeve arranged concentrically with respect to the housing and to the piston, and configured to restrain the piston relative to the housing and receive a second portion of the pressurized fluid from the pump to selectively release the piston. A vehicle including a suspension corner connecting the vehicle's road wheel to the vehicle's body, the fluid pump, and the subject hydraulic actuator assembly to change the vehicle's ride height at the suspension corner is also disclosed. The vehicle may also include a controller configured to control the actuator assembly.

20 Claims, 5 Drawing Sheets

(56) References Cited

U.S. PATENT DOCUMENTS

| | | | |
|---|---|---|---|
| 6,907,961 B2 | 6/2005 | Allen et al. | |
| 7,066,699 B2 | 6/2006 | Gosling | |
| 7,648,176 B2 | 1/2010 | Van Bilderbeek | |
| 7,770,902 B1* | 8/2010 | Davis | B60G 3/145 |
| | | | 180/9.5 |
| 9,643,466 B1* | 5/2017 | Christoff | B60G 17/005 |
| 2007/0194172 A1* | 8/2007 | Luce | B64C 25/60 |
| | | | 244/100 R |
| 2009/0095584 A1* | 4/2009 | Kondo | B60G 11/15 |
| | | | 188/267 |
| 2015/0290992 A1* | 10/2015 | Mochizuki | B60G 15/062 |
| | | | 280/5.514 |
| 2017/0291465 A1* | 10/2017 | Christoff | B60G 15/10 |

* cited by examiner

HYDRAULICALLY OPERATED ACTUATOR FOR CONTROLLING VEHICLE RIDE HEIGHT

TECHNICAL FIELD

The present disclosure relates to a hydraulically operated actuator for controlling a ride height of a vehicle.

BACKGROUND

Contemporary on- and off-road going vehicles typically employ suspension systems that generally include a system of springs, shock absorbers, and linkages that connect a vehicle body to the vehicle's wheels. Because the majority of forces acting on the vehicle body are transmitted through contact patches between the road and the tires, one of the main objectives of a vehicle suspension is to maintain the contact between the vehicle's road wheels and the road surface.

Vehicle suspension systems generally contribute to the vehicle's road-holding/handling and braking, as well as provide comfort and reasonable isolation from road noise, bumps, and vibrations to the vehicle occupants. Because these objectives are generally at odds, the tuning of suspensions involves finding a compromise that is appropriate to each vehicle's intended purpose. For example, a suspension for a sporting vehicle may be tuned to give up some ride comfort in return for enhanced operator control, while a suspension for a luxury vehicle may be tuned for the opposite outcome.

The vehicle's intended purpose, along with the specific design of its suspension, also influences the vehicle's ride height, i.e., the set height of the vehicle's body relative to the road surface. In order to accommodate various, and at times conflicting, vehicle objectives, adjustable vehicle ride height suspensions have become more popular.

SUMMARY

A hydraulic actuator assembly is disclosed. Such a hydraulic actuator assembly can be employed in a vehicle that includes a vehicle body, a road wheel configured to generate contact with a road surface, a suspension corner connecting the road wheel to the vehicle body and configured to maintain contact between the road wheel and the road surface, and a pump configured to supply a pressurized fluid. The hydraulic actuator assembly is configured to receive the pressurized fluid from the pump. The hydraulic actuator assembly includes a housing and a piston arranged concentrically with respect to a longitudinal axis, wherein the housing is configured to receive a first portion of the pressurized fluid to displace or translate the piston relative to the housing. The hydraulic actuator assembly also includes a sleeve arranged concentrically with respect to the housing and to the piston, and configured to restrain the piston relative to the housing and receive a second portion of the pressurized fluid from the pump to selectively release the piston.

The sleeve can include an inner surface defined by an inner diameter and an outer surface defined by an outer diameter. The sleeve can define a slit extending along the longitudinal axis and connecting the inner diameter and the outer diameter. As a result, the sleeve can be configured as a non-continuous ring having an interference fit with the piston.

The sleeve can also define a first channel arranged on the inner surface and a second channel arranged on the outer surface, each channel being configured to accept a respective fraction of the second portion of the pressurized fluid to thereby release the piston.

The housing can include a first housing section, a second housing section, and a third housing section arranged between and fixed to each of the first housing section and the second housing section. The first housing section can include a first port configured to receive the first portion of the pressurized fluid. The second housing section can include a second port configured to receive the second portion of the pressurized fluid. Additionally, the third housing section can be configured to retain the sleeve, receive the second portion of the fluid from the second housing section, and expand in response to the second portion of the fluid, thereby facilitating expansion of the sleeve to release the piston.

The respective fraction of the second portion of the pressurized fluid accepted by the first channel expands the third housing section at or surrounding the sleeve. The respective fraction of the second portion of the pressurized fluid accepted by the second channel expands the sleeve at the slit. The expansion of the third housing section together with the expansion of the sleeve at the slit release the piston.

The hydraulic actuator assembly can include an annular spacer configured to fix the sleeve along the longitudinal axis relative to the third housing section.

The first housing section and the third housing section together can define a pocket configured to accept the piston. In such a case, the piston can be configured to slide within the pocket.

The sleeve can be configured to selectively restrain the piston in infinitely variable, i.e., non-discrete, positions relative to the third housing section.

The hydraulic actuator assembly can include a plurality of fasteners configured to fix the first housing section relative to the second housing section.

The hydraulic actuator assembly can additionally include a first sealing element configured to fluidly seal the first housing section to the third housing section, a second sealing element configured to fluidly seal the second housing section to the third housing section, and a third sealing element configured to fluidly seal the third housing section to the piston.

The hydraulic actuator assembly can additionally include a damper configured to absorb and damp shock impulses received by the road wheel from the road surface. The damper can extend concentrically with respect to and be fixed relative to the piston, such as via a snap ring.

The piston can define an aperture. The damper can include a projection extending through the aperture and configured to be acted on by the first portion of the pressurized fluid.

The hydraulic actuator assembly can include a fourth sealing element configured to fluidly seal the damper to the piston.

The damper can include a pilot configured to maintain the damper and the piston concentric relative to one another.

The vehicle can also include a sensor configured to detect the height of the vehicle body relative to the road surface at the suspension corner and generate a signal indicative of the detected height of the vehicle body. The vehicle can additionally include a first valve configured to control supply of the first portion of the pressurized fluid to the first port and a second valve configured to control supply of the second portion of the pressurized fluid to the second port. The vehicle can furthermore include a controller in communication with the sensor and with each of the first and second valves, and configured to receive the signal indicative of the detected height of the vehicle body, regulate the first valve to generate a first fluid pressure at the first port, and regulate the second valve to generate a second fluid pressure at the second port to release the sleeve. The controller can thereby change the height of the vehicle body relative to the road surface at the suspension corner from the detected height of the vehicle body.

The above features and advantages, and other features and advantages of the present disclosure, will be readily apparent from the following detailed description of the embodiment(s) and best mode(s) for carrying out the present disclosure when taken in connection with the accompanying drawings and appended claims.

DETAILED DESCRIPTION

Figure 1:
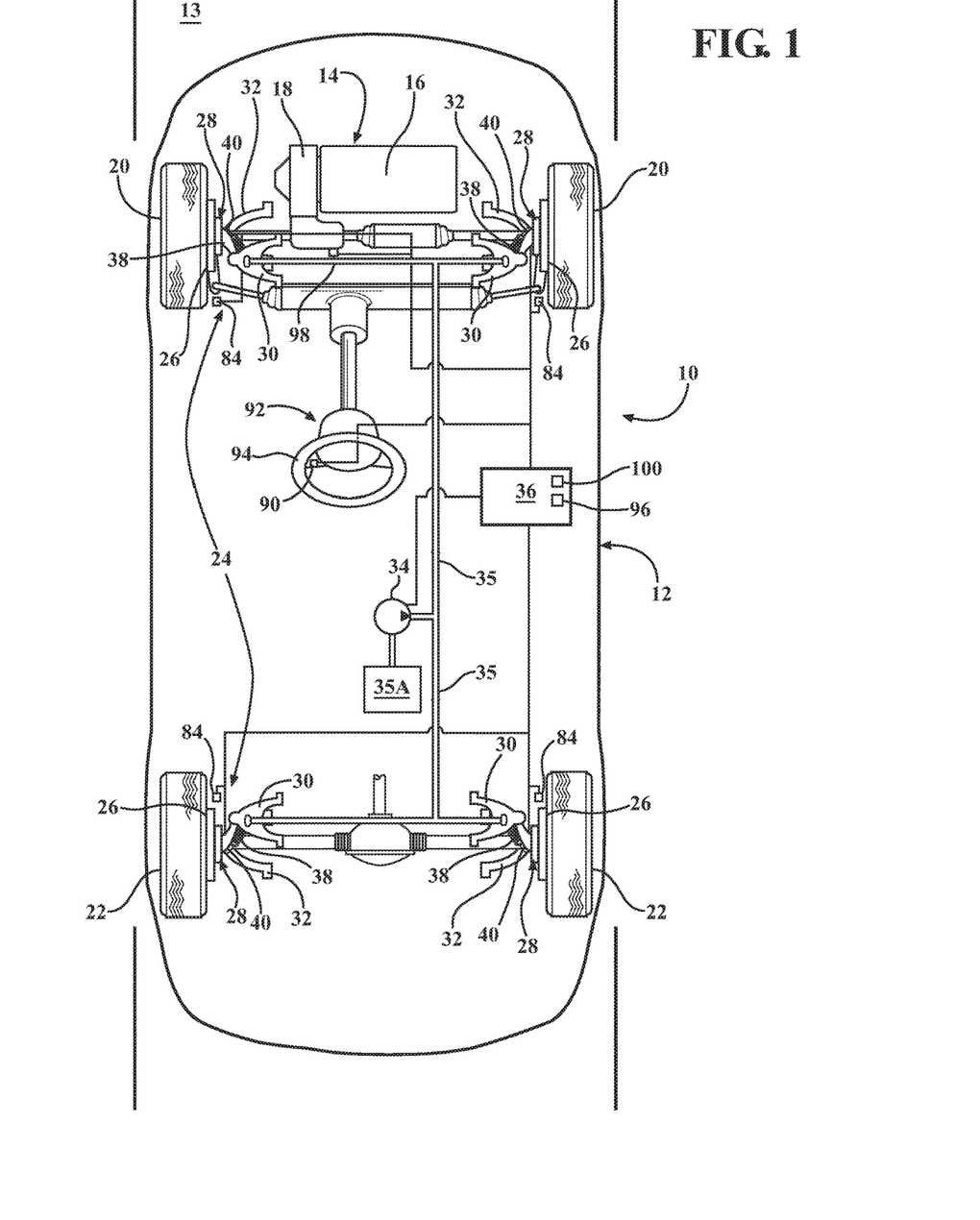
FIG. 1 is a plan view of a motor vehicle having a suspension system according to the disclosure.

Referring to the drawings, wherein like reference numbers refer to like components, FIG. 1 shows a schematic view of a motor vehicle 10, which includes a vehicle body 12. The vehicle 10 also includes a powertrain 14 configured to propel the vehicle. As shown in FIG. 1, the powertrain 14 includes an engine 16 and a transmission 18. The powertrain 14 may also include one or more motor/generators and a fuel cell, neither of which are shown, but a powertrain configuration employing such devices would be appreciated by those skilled in the art.

Figure 2:
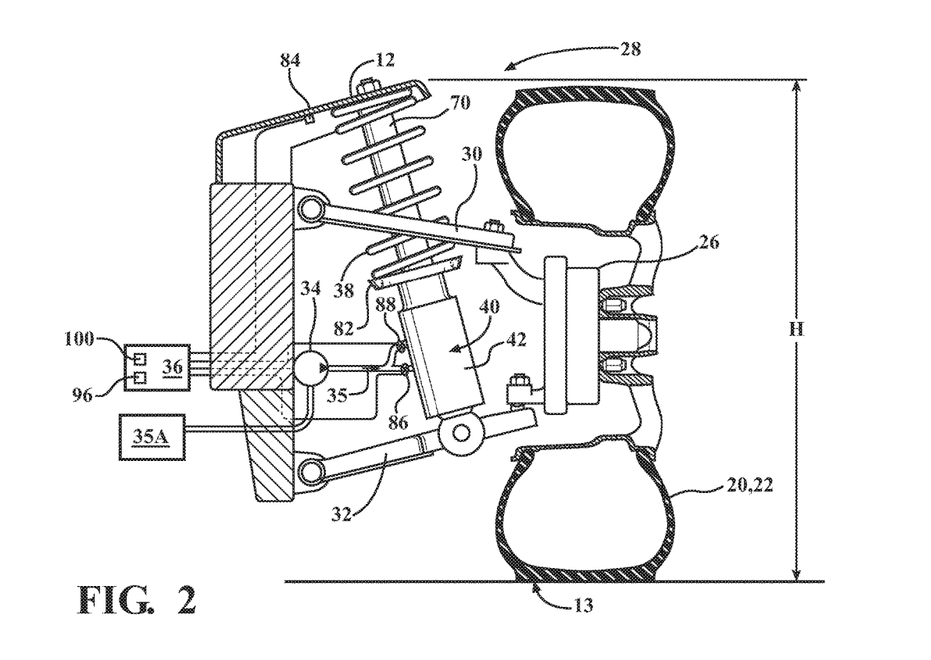
FIG. 2 is an enlarged schematic cross-sectional illustration of a representative suspension corner of the vehicle shown in FIG. 1, having a spring, a damper, and an actuator according to the disclosure.
Figure 3:
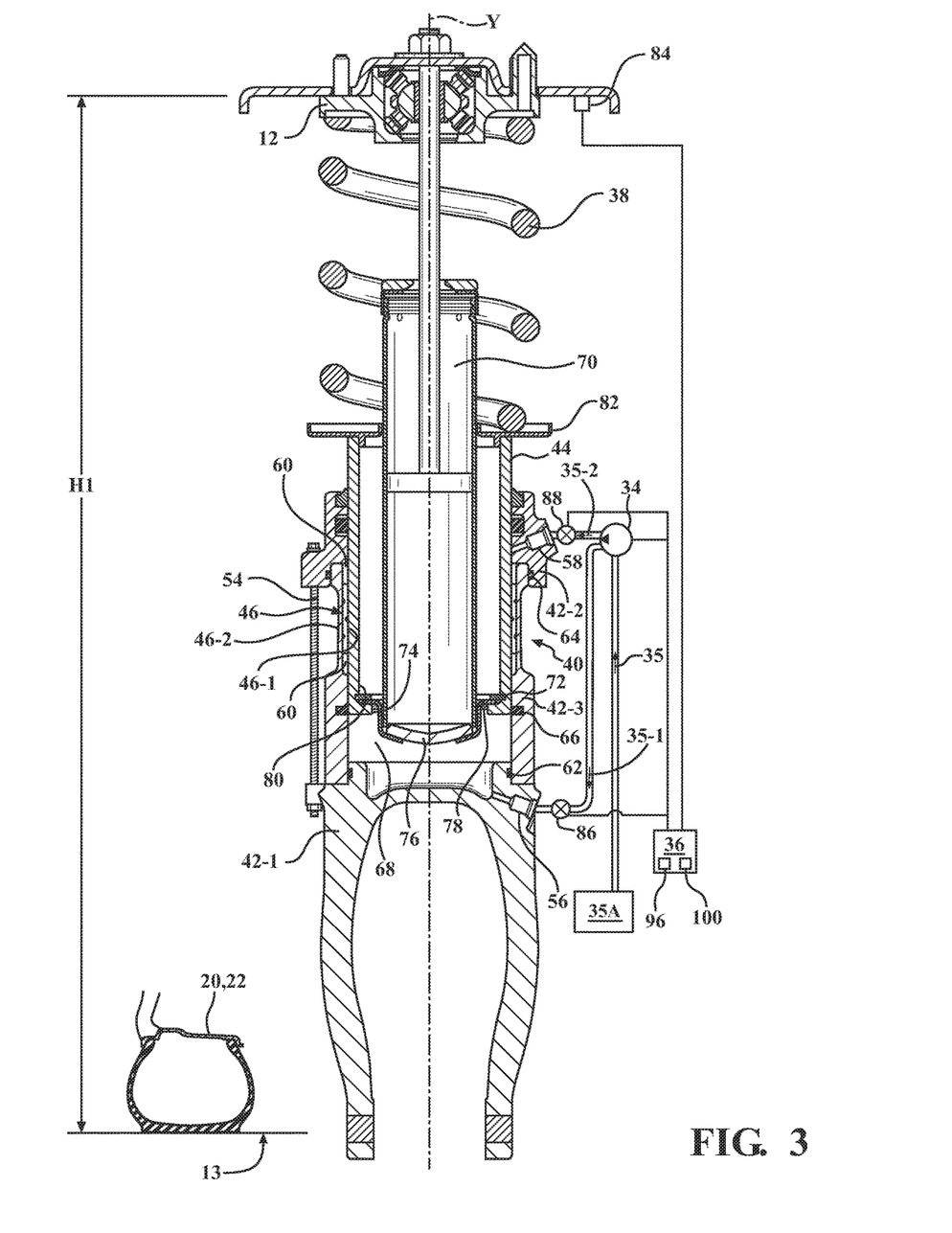
FIG. 3 is a schematic cross-sectional view of the actuator shown in FIG. 2, including a hydraulically actuated sleeve configured to restrain a piston, wherein the actuator is shown in an extended position.

The vehicle 10 also includes a plurality of road wheels that include front wheels 20 and rear wheels 22, each wheel being configured to generate contact with a road surface 13. Although four wheels, i.e., a pair of front wheels 20 and a pair of rear wheels 22, are shown in FIG. 1, a vehicle with fewer or greater number of wheels is also envisioned. As shown, a vehicle suspension system 24 operatively connects the body 12 to the front and rear wheels 20, 22 for maintaining contact between the wheels and the road surface 13, and for maintaining handling of the vehicle 10. The suspension system 24 includes a plurality of knuckles 26, each configured to support a respective road wheel 20, 22 via a wheel hub and bearing assembly (not shown). Each knuckle 26 may be operatively connected to the body 12 via an upper control arm 30 and a lower control arm 32. FIGS. 2-3 depict a representative corner 28 of the suspension system 24, which includes a representative knuckle 26.

As shown in the FIGS. 2-3, at each individual suspension corner 28, the vehicle body 12 is characterized by a specific height H relative to the road surface 13, i.e., vehicle ride height at the respective suspension corner. The suspension system 24 includes a fluid pump 34 configured to supply a pressurized fluid 35 from a reservoir 35A. The fluid pump 34 can be driven via an electric motor (not shown). Additionally, the suspension system 24 includes an electronic controller 36. According to the disclosure, the controller 36 is configured to regulate operation of the pump 34, such as via the electric motor, to vary the vehicle ride height H at the suspension corner(s) 28. For example, the controller 36 can be configured to increase the vehicle ride height H at the suspension corner(s) 28 via activating operation of the pump 34.

The controller 36 may be a vehicle body controller configured to operate other systems of the vehicle 10, such as the braking and stability control systems, which are not specifically shown, but understood by those skilled in the art. Accordingly, the controller 36 is in electrical communication with the fluid pump 34 and various sensors in order to facilitate regulation of the vehicle suspension system 24 in real time, as will be discussed in detail below. In order to appropriately control operation of the suspension system 24, the controller 36 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 36 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 36 may also include a floppy disk, a flexible disk, hard disk, magnetic tape, any other magnetic medium, a CD-ROM, DVD, any other optical medium, etc. The controller 36 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 36 or accessible thereby may be stored in the memory and automatically executed to provide the required functionality.

The suspension system 24 also includes a spring 38, and a hydraulic actuator assembly 40 connected to each of the front and rear wheels 20, 22, as represented by an individual suspension corner 28 (shown in FIGS. 2-3). Depending on the operating conditions of the vehicle 10, the hydraulic actuator assembly 40 receives pressurized fluid 35 from the pump 34. The knuckle 26 has its motion controlled in response to road input by the spring 38 and a damper that will be discussed in greater detail below, which cushion and/or dampen forces being generated at the wheel 20, 22 as the vehicle 10 traverses the road surface 13. Although a specific configuration of the suspension system 24 is shown in FIGS. 1-3, other vehicle suspension designs are similarly envisioned, such as another embodiment of the individual suspension corner 28 that is shown in FIG. 4.

The actuator assembly 40 selectively extends and contracts in response to a volume of the pressurized fluid 35 received from the pump 34, and is also configured to be locked in position and hydraulically unlocked, as will be described in detail below. As the actuator assembly 40 selectively extends and contracts, such action selectively varies, i.e., increases or reduces, the height H of the vehicle body 12 relative to the road surface 13 at the suspension corner 28. Accordingly, a locked position of the actuator assembly 40 sets a particular height H of the vehicle body 12 relative to the road surface 13 at the suspension corner 28. The actuator assembly 40 includes a housing 42 and a piston 44 arranged concentrically with respect to a longitudinal axis Y. The housing 42 is configured to receive a first portion 35-1 of the pressurized fluid 35 from the pump 34 to displace or translate the piston 44 relative to the housing. The hydraulic actuator assembly 40 also includes a hydraulically actuated sleeve 46 arranged concentrically with respect to the housing 42 and to the piston 44. The sleeve 46 is configured to restrain the piston 44 relative to the housing 42, to thereby lock the height H of the vehicle body 12 relative to the road surface 13 at the suspension corner 28. The sleeve 46 is additionally configured to receive a second portion 35-2 of the pressurized fluid 35 from the pump 34 to selectively release the piston 44.

Figure 4:
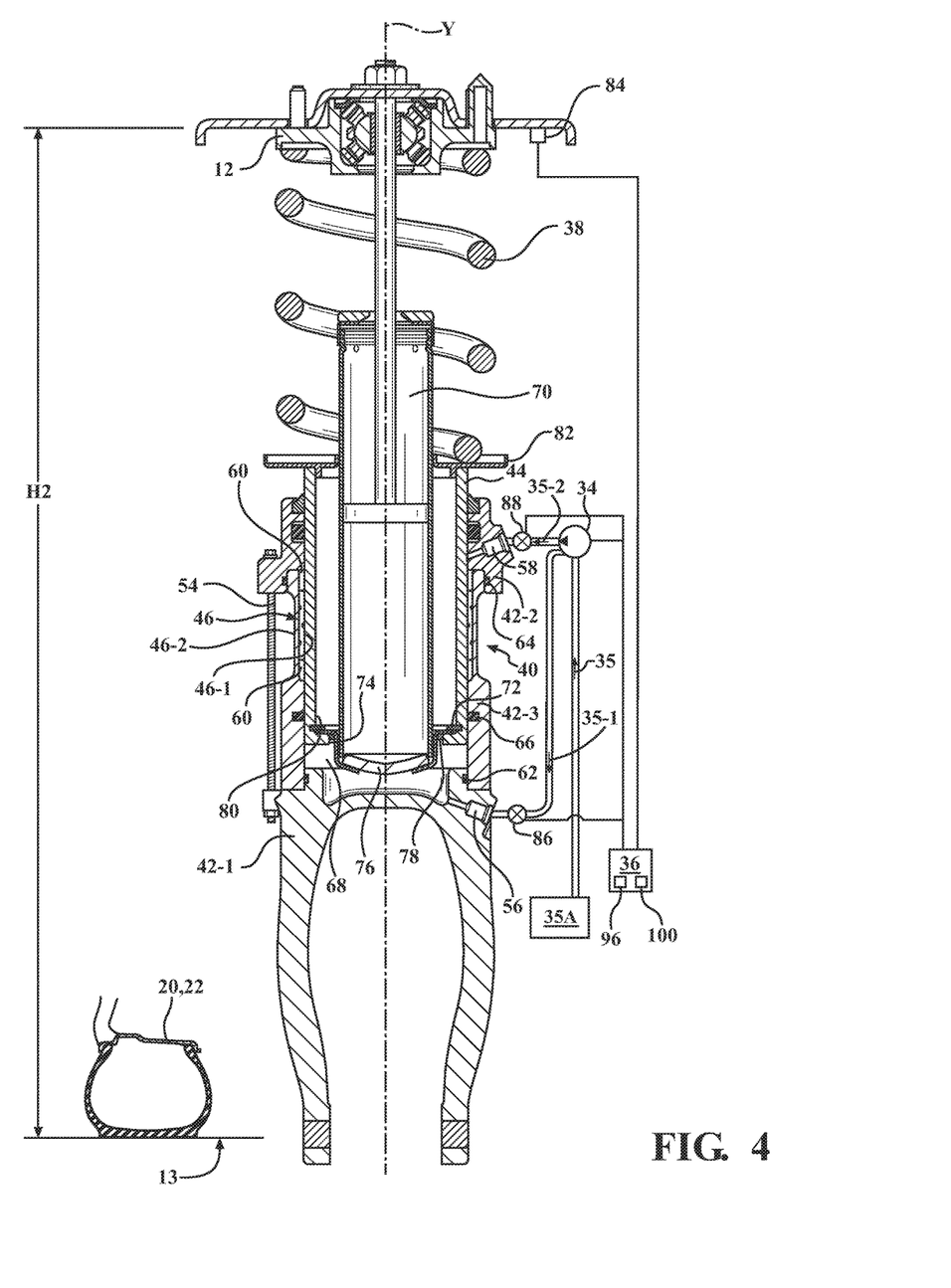
FIG. 4 is a schematic cross-sectional view of the actuator shown in FIGS. 2 and 3, wherein the actuator is shown in an exemplary intermediate position.
Figure 5:
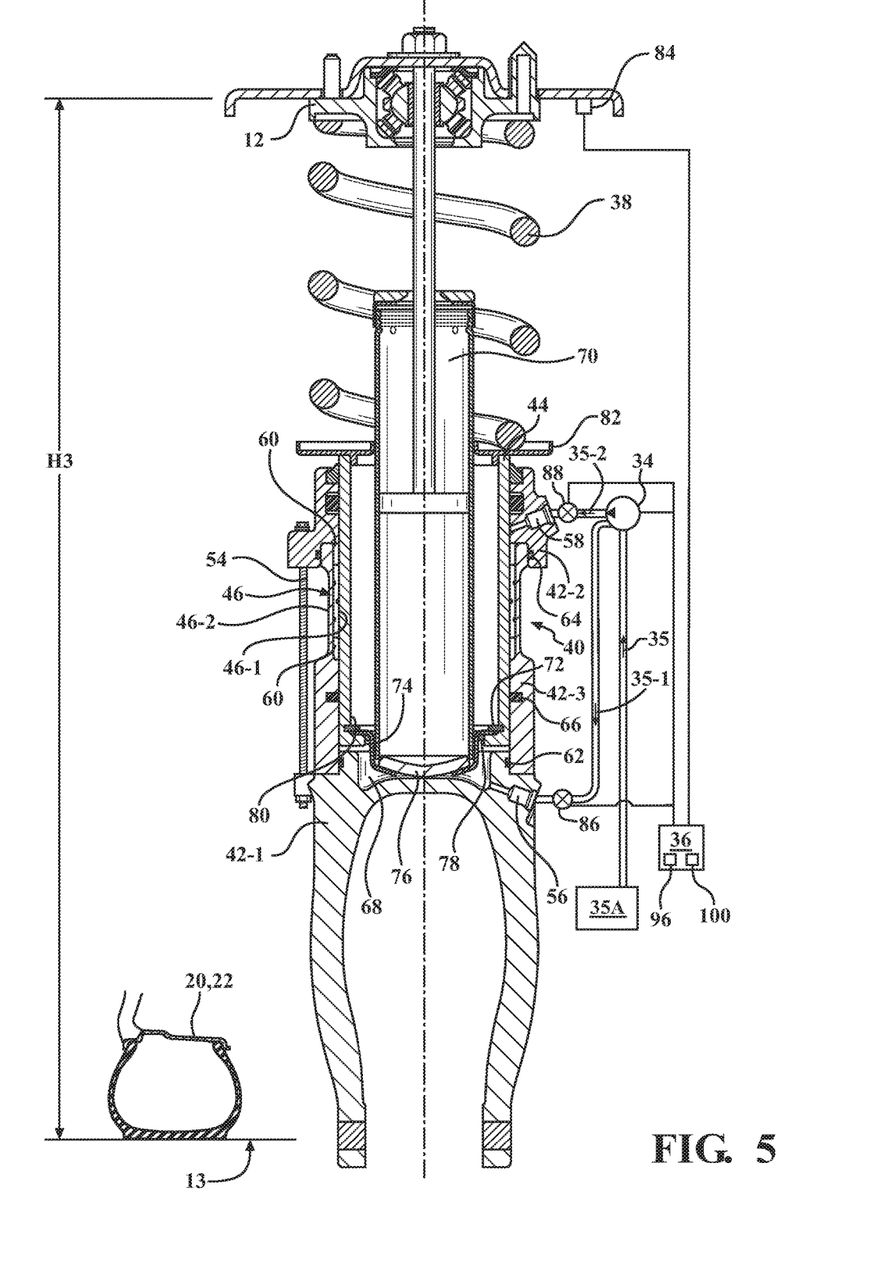
FIG. 5 is a schematic cross-sectional view of the actuator shown in FIGS. 2-4, wherein the actuator is shown in a compressed position.
Figure 6:
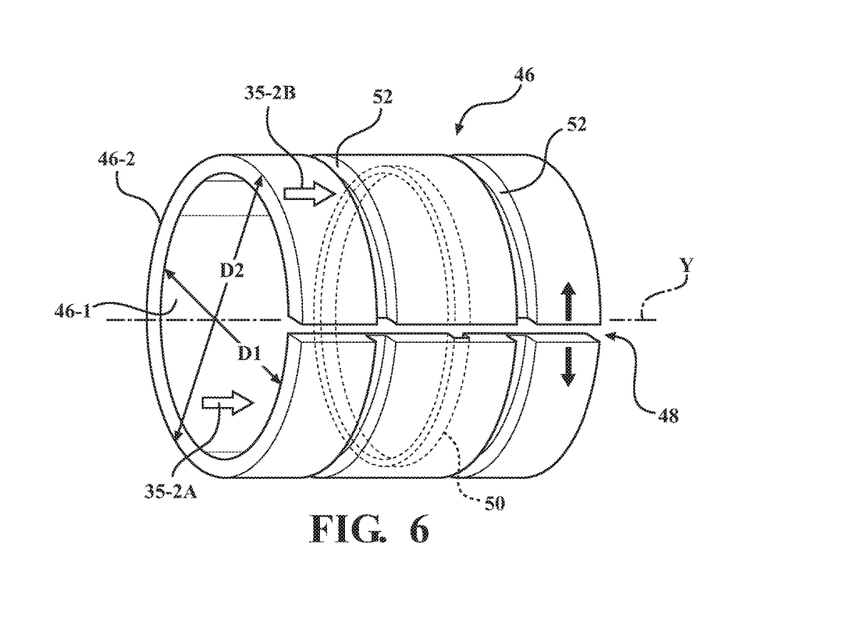
FIG. 6 is a schematic close-up perspective illustration of the hydraulically actuated sleeve shown in FIGS. 3-5.

As shown in FIGS. 3-6, the sleeve 46 includes an inner surface 46-1 defined by an inner diameter D1 (shown in FIG. 6) and an outer surface 46-2 defined by an outer diameter D2 (shown in FIG. 6). The sleeve 46 can additionally define a slit 48 extending along the longitudinal axis Y and connecting the inner diameter D1 and the outer diameter D2. Accordingly, as shown, the sleeve 46 is generally configured, i.e., structured, as a non-continuous ring that, in its default state, generates an interference fit with and restrains the piston 44. As shown, the sleeve 46 can additionally define at least one first channel 50 arranged on the inner surface 46-1 and at least one second channel 52 arranged on the outer surface 46-2. As shown in a close-up view of FIG. 6, the sleeve 46 includes a single first channel 50 and two second channels 52, however the count for each respective channel, as well as their relative positions, can be different. Each channel 50, 52 is configured to accept a respective fraction or volume of the second portion 35-2 of the pressurized fluid 35 to thereby release the piston 44—specifically, as shown, the first channel 50 receives a fraction 35-2A, while the second channel 52 receives a fraction 35-2B.

As shown in FIGS. 3-5, the housing 42 includes a first housing section 42-1, a second housing section 42-2, and a third housing section 42-3. The third housing section 42-3 is arranged between and fixed to each of the first housing section 42-1 and the second housing section 42-2. The actuator assembly 40 includes a plurality of fasteners 54 configured to fix the first housing section 42-1 relative to the second housing section 42-2 and capture the third housing section 42-3 therebetween. As also shown in FIGS. 3-5, the first housing section 42-1 can include a first port 56 configured to receive the first portion 35-1 of the pressurized fluid 35 for displacing the piston 44. The second housing section 42-2 can include a second port 58 configured to receive the second portion 35-2 of the pressurized fluid 35 for unlocking the sleeve 46.

As additionally shown in FIGS. 3-5, the third housing section 42-3 is configured to retain the sleeve 46, receive the second portion 35-2 of the pressurized fluid 35 from the second housing section 42-2, and expand in response to the second portion of the fluid. Such expansion of the third housing section 42-3 facilitates expansion of the sleeve 46 to release the piston 44. The sleeve 46 can be configured to selectively restrain the piston 44 in infinitely variable or non-discrete positions relative to the third housing 42-3 when the fluid pressure is not elevated therein. Accordingly, the piston 44 is retained by the sleeve 46, which is in turn retained by the third housing section 42-3 via friction at the respective interfaces. Respective materials of the third housing section 42-3, the piston 44, and the sleeve 46 can be defined to achieve the desired friction coefficient and piston retention at the piston-sleeve interface. Specifically, each of the third housing section 42-3, the piston 44, and the sleeve 46 can have metal or engineered plastic construction.

The respective fraction 35-2A of the second portion 35-2 of the pressurized fluid accepted by the first channel 50 expands the third housing section 42-3, specifically at the sleeve 46. Such expansion of the third housing 42-3 provides radial space for the sleeve 46 to expand away from the piston 44. Accordingly, the respective fraction 35-2B of the second portion 35-2 of the pressurized fluid accepted by the second channel 52 expands the sleeve 46 at the slit 48. Consequently, the expansion of the third housing section 42-3 together with the expansion of the sleeve 46 at the slit 48 releases the piston 44 to permit adjustment of the actuator assembly 40 to vary the height H of the vehicle body 12 relative to the road surface 13 at the suspension corner 28. The height H of the vehicle body 12 can be varied via the actuator assembly 40 as desired between maximum design height H1 (shown in FIG. 3), through any intermediate height H2 (shown in FIG. 4), and down to a minimum design height H3 (shown in FIG. 5). The location of the piston 44 relative to the housing 42 along the longitudinal axis Y can be varied continuously between the piston's minimum and maximum travel, i.e., without any set or predetermined positions. Accordingly, the height of the vehicle body 12 relative to the road surface 13 at the suspension corner 28 can also be varied continuously.

As shown in FIGS. 3-5, the actuator assembly 40 can also include annular spacers 60 configured to fix the sleeve 46 along the longitudinal axis Y relative to the third housing section 42-3. The actuator assembly 40 can additionally include a first sealing element 62, a second sealing element 64, and a third sealing element 66. The first sealing element 62 is configured to fluidly seal the first housing section 42-1 to the third housing section 42-3. The second sealing element 64 is configured to fluidly seal the second housing section 42-2 to the third housing section 42-3. The third sealing element 66 is configured to fluidly seal the third housing section 42-3 to the piston 44. As shown in FIGS. 3-5, the first housing section 42-1 and the third housing section 42-3 together define a pocket 68 configured to accept the piston 44, such that the piston 44 can slide within the pocket.

As shown in FIGS. 2-5, the actuator assembly 40 can additionally include a damper 70 configured to absorb and damp shock impulses received by the respective road wheel 20 or 22 from the road surface 13. As shown, the damper 70 extends concentrically with respect to and is fixed relative to the piston 44, such as via a snap ring 72. The piston 44 can define an aperture 74 (shown in FIGS. 3-5) configured to locate the damper 70. In such an embodiment, the damper 70 can include a projection 76 extending through the aperture 74 and configured to be acted on by the first portion 35-1 of the pressurized fluid 35 during adjustment of the height H of the vehicle body 12 at the subject suspension corner 28. The actuator assembly 40 can also include a fourth sealing element 78 configured to fluidly seal the damper 70 to the piston 44. The damper 70 can also include a pilot 80 configured to maintain the damper and the piston 44 concentric relative to one another. The pilot 80 can be configured as a ring extending radially out from the damper 70 and in fixed contact with the piston 44. The actuator assembly 40 can additionally include a spring seat 82 configured to provide a reaction surface for the spring 38, while the damper 70 is arranged to extend through the piston 44. Although the spring seat 82 is illustrated as being arranged on the piston 44, nothing precludes the actuator assembly 40 being configured such that the spring seat is arranged on the first housing section 42-1, and the actuator assembly being arranged in the vehicle 10 upside-down to accommodate such an embodiment.

With resumed reference to FIGS. 1 and 2, the vehicle 10 can include individual sensors 84. Each sensor 84 is configured to detect the height H of the vehicle body 12 relative to the road surface 13 at the respective suspension corners 28 and generate a signal indicative of the respective detected height H. The vehicle 10 can also include a first valve 86 configured to control supply of the first portion 35-1 of the pressurized fluid 35 to the first port 56 and a second valve 88 configured to control supply of the second portion 35-2 of the pressurized fluid to the second port 58 (shown in FIG. 2). Furthermore, the controller 36 is programmed to change the vehicle ride height H at the specific suspension corner 28 after the piston 44 has been released by the sleeve 46. Changing the ride height H is accomplished by the controller 36 selectively regulating operation of the fluid pump 34 along with the first and second valves 86, 88. The regulation of the fluid pump 34 can be accomplished via specific voltage or current commands intended to modulate operating speed of the pump for delivering the fluid 35 to the valves 86, 88. Specific regulation of the fluid pump 34 and the valves 86, 88 can depend on the target ride height H, specific road conditions, such as a profile of the road surface 13, i.e., whether the vehicle 10 is traversing uneven terrain, a road speed of the vehicle, and the general performance expected from the vehicle by its operator.

The controller 36 can also be configured to monitor the vehicle ride height H at each suspension corner 28, such as via communication with the sensor(s) 84. The controller 36 can furthermore be configured to determine if the change in the vehicle ride height H at any suspension corner 28 is required in response to the monitored vehicle ride height. Also, the controller 36 can be configured to receive a request to change the vehicle ride height H at the suspension corner(s) 28. Additionally, in response to the received request to change the vehicle ride height H, the controller 36 can be configured to determine if the change in the vehicle ride height is required. The vehicle 10 can also include a user-interface-based manual switch 90 (shown on FIG. 1) in operative communication with the controller 36. The manual switch 90 can be arranged inside a passenger compartment 92 of the vehicle 10, within reach of the operator of the vehicle, such as on a steering wheel 94. The manual switch 90 can be configured to accept the request to change the vehicle ride height H at the suspension corner(s) 28 from the operator of the vehicle and communicate the requested change to the controller 36.

As shown, the controller 36 is in communication with the sensor(s) 84 and with each of the first and second valves 86, 88. The controller 36 is configured to receive the signal indicative of the detected height of the vehicle body from the sensor(s) 84. The controller 36 can additionally be configured to compare the detected height of the vehicle body 12 to a desired height H, which can be pre-programmed into the controller, for example as part of a look-up table 96. The controller 36 is also configured to regulate the first valve 86 to generate a first fluid pressure P1 at the first port 56, and regulate the second valve 88 to generate a second fluid pressure P2 at the second port 58 to release the sleeve 46. The first fluid pressure P1 can be determined empirically for various heights H of the vehicle body 12 and programmed into the controller 36 as part of a look-up table 96. Alternatively, the first fluid pressure P1 can be determined via a computational algorithm programmed into the controller 36 and accessed in real time thereby. The second valve 88 can be operated via the controller 36 to achieve the second fluid pressure P2 in order to release of the piston 44 via the sleeve 46. Accordingly, the height H of the vehicle body 12 can be changed at the respective suspension corner 28 from the detected height to the desired height following the sequence of the first fluid pressure P1 being set and the release of the sleeve 46 via the second fluid pressure P2.

As shown in FIG. 1, the vehicle 10 can additionally include a second sensor 98 configured to detect a road speed of the vehicle and communicate the detected road speed to the controller 36. The controller 36 can be configured to generate a command to change the vehicle ride height H at any suspension corner 28 automatically in response to the detected road speed of the vehicle 10. The programming of the controller 36 can include an algorithm or subroutine to reconcile the request to change the vehicle ride height H with the detected road speed. For example, the controller 36 may deny commanding a vehicle ride height H to be increased if the detected road speed of the vehicle 10 is above a predetermined value 100, such as greater than 50 miles per hour, in order to maintain high speed vehicle handling and maximize vehicle fuel efficiency. On the other hand, the controller 36 may command the vehicle ride height H to be increased if the detected road speed of the vehicle 10 is below the predetermined value, such as during vehicle parking maneuvers. Additionally, the controller may be programmed to automatically release the piston 44 via the sleeve 46 and reduce the vehicle ride height H to the minimum travel P2 limit at any or all suspension corners 28 after the vehicle 10 has come to a stop and a park mode has been selected in the transmission 18 to permit passengers of the vehicle to disembark.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
a vehicle body;
a road wheel configured to generate contact with a road surface;
a suspension corner connecting the road wheel to the vehicle body and configured to maintain the contact between the road wheel and the road surface;

a pump configured to supply a pressurized fluid; and
a hydraulic actuator assembly arranged at the suspension corner and configured to receive the pressurized fluid from the pump and thereby vary a height of the vehicle body relative to the road surface at the suspension corner;
wherein the hydraulic actuator assembly includes:
a housing and a piston arranged concentrically with respect to a longitudinal axis, wherein the housing is configured to receive a first portion of the pressurized fluid from the pump to displace the piston relative to the housing; and
a sleeve arranged concentrically with respect to the housing and to the piston, and configured to restrain the piston relative to the housing to thereby lock the height of the vehicle body relative to the road surface at the suspension corner and receive a second portion of the pressurized fluid from the pump to selectively release the piston.

2. The vehicle according to claim 1, wherein the sleeve includes an inner surface defined by an inner diameter and an outer surface defined by an outer diameter, and wherein the sleeve defines:
a slit extending along the longitudinal axis and connecting the inner diameter and the outer diameter; and
a first channel arranged on the inner surface and a second channel arranged on the outer surface, each channel being configured to accept a respective fraction of the second portion of the pressurized fluid to thereby release the piston.

3. The vehicle according to claim 2, wherein the housing includes a first housing section, a second housing section, and a third housing section arranged between and fixed to each of the first housing section and the second housing section, and wherein:
the first housing section includes a first port configured to receive the first portion of the pressurized fluid;
the second housing section includes a second port configured to receive the second portion of the pressurized fluid; and
the third housing section is configured to retain the sleeve, receive the second portion of the fluid from the second housing section, and expand in response to the second portion of the fluid, thereby facilitating expansion of the sleeve to release the piston.

4. The vehicle according to claim 3, wherein:
the respective fraction of the second portion of the pressurized fluid accepted by the first channel expands the third housing section at the sleeve;
the respective fraction of the second portion of the pressurized fluid accepted by the second channel expands the sleeve at the slit; and
the expansion of the third housing section together with the expansion of the sleeve at the slit release the piston.

5. The vehicle according to claim 3, wherein the hydraulic actuator assembly includes an annular spacer configured to fix the sleeve along the longitudinal axis relative to the third housing section.

6. The vehicle according to claim 3, wherein the hydraulic actuator assembly includes:
a first sealing element configured to fluidly seal the first housing section to the third housing section;
a second sealing element configured to fluidly seal the second housing section to the third housing section; and
a third sealing element configured to fluidly seal the third housing section to the piston.

7. The vehicle according to claim 3, wherein the first housing section and the third housing section together define a pocket configured to accept the piston, and wherein the piston is configured to slide within the pocket.

8. The vehicle according to claim 3, further comprising:
a sensor configured to detect the height of the vehicle body relative to the road surface at the suspension corner and generate a signal indicative of the detected height of the vehicle body;
a first valve configured to control supply of the first portion of the pressurized fluid to the first port and a second valve configured to control supply of the second portion of the pressurized fluid to the second port; and
a controller in communication with the sensor and with each of the first and second valves, and configured to receive the signal indicative of the detected height of the vehicle body, regulate the first valve to generate a first fluid pressure at the first port, and regulate the second valve to generate a second fluid pressure at the second port to release the sleeve and to thereby change the height of the vehicle body relative to the road surface at the suspension corner from the detected height of the vehicle body.

9. The vehicle according to claim 1, wherein the hydraulic actuator assembly additionally includes a damper configured to absorb and damp shock impulses received by the road wheel from the road surface, wherein the damper extends concentrically with respect to and is fixed relative to the piston.

10. The vehicle according to claim 9, wherein the damper includes a pilot configured to maintain the damper and the piston concentric relative to one another.

11. A hydraulic actuator assembly configured to receive a pressurized fluid from a pump, the hydraulic actuator comprising:
a housing and a piston arranged concentrically with respect to a longitudinal axis, wherein the housing is configured to receive a first portion of the pressurized fluid to displace the piston relative to the housing;
a sleeve arranged concentrically with respect to the housing and to the piston, and configured to restrain the piston relative to the housing and receive a second portion of the pressurized fluid from the pump to selectively release the piston.

12. The hydraulic actuator assembly according to claim 11, wherein the sleeve includes an inner surface defined by an inner diameter and an outer surface defined by an outer diameter, and wherein the sleeve defines:
a slit extending along the longitudinal axis and connecting the inner diameter and the outer diameter; and
a first channel arranged on the inner surface and a second channel arranged on the outer surface, each channel being configured to accept a respective fraction of the second portion of the pressurized fluid to thereby release the piston.

13. The hydraulic actuator assembly according to claim 12, wherein the housing includes a first housing section, a second housing section, and a third housing section arranged between and fixed to each of the first housing section and the second housing section, and wherein:
the first housing section includes a first port configured to receive the first portion of the pressurized fluid;
the second housing section includes a second port configured to receive the second portion of the pressurized fluid; and
the third housing section is configured to retain the sleeve, receive the second portion of the fluid from the second housing section, and expand in response to the second portion of the fluid, thereby facilitating expansion of the sleeve to release the piston.

14. The hydraulic actuator assembly according to claim 13, wherein:
the respective fraction of the second portion of the pressurized fluid accepted by the first channel expands the third housing section at the sleeve;
the respective fraction of the second portion of the pressurized fluid accepted by the second channel expands the sleeve at the slit; and
the expansion of the third housing section together with the expansion of the sleeve at the slit release the piston.

15. The hydraulic actuator assembly according to claim 13, wherein the actuator includes an annular spacer configured to fix the sleeve along the longitudinal axis relative to the third housing section.

16. The hydraulic actuator assembly according to claim 13, wherein the first housing section and the third housing section together define a pocket configured to accept the piston, and wherein the piston is configured to slide within the pocket.

17. The hydraulic actuator assembly according to claim 13, wherein the housing includes:

a first sealing element configured to fluidly seal the first housing section to the third housing section;
a second sealing element configured to fluidly seal the second housing section to the third housing section; and
a third sealing element configured to fluidly seal the third housing section to the piston.

18. The hydraulic actuator assembly according to claim 17, further comprising a damper configured to absorb and damp shock impulses, wherein the damper extends concentrically with respect to and is fixed relative to the piston.

19. The hydraulic actuator assembly according to claim 18, wherein the damper includes a pilot configured to maintain the damper and the piston concentric relative to one another.

20. The hydraulic actuator assembly according to claim 18, wherein the piston defines an aperture, and the damper includes a projection extending through the aperture and configured to be acted on by the first portion of the pressurized fluid, and wherein the actuator includes a fourth sealing element configured to fluidly seal the damper to the piston.

* * * * *